(12) United States Patent
Vadayadiyil Raveendran et al.

(10) Patent No.: US 11,277,381 B2
(45) Date of Patent: Mar. 15, 2022

(54) MULTI-CHANNEL BASED JUST-IN-TIME FIREWALL CONTROL

(71) Applicant: KYNDRYL, INC., New York, NY (US)

(72) Inventors: Pramod Vadayadiyil Raveendran, Bengaluru (IN); Seema Nagar, Bangalore (IN); Sougata Mukherjea, New Delhi (IN); Kuntal Dey, Vasant Kunj (IN)

(73) Assignee: KYNDRYL, INC., New York, NY (US)

(*) Notice: Subject to any disclaimer, the term of this patent is extended or adjusted under 35 U.S.C. 154(b) by 22 days.

(21) Appl. No.: 16/863,206

(22) Filed: Apr. 30, 2020

(65) Prior Publication Data

US 2021/0344645 A1    Nov. 4, 2021

(51) Int. Cl.
H04L 29/06    (2006.01)

(52) U.S. Cl.
CPC ...... H04L 63/0236 (2013.01); H04L 63/0428 (2013.01)

(58) Field of Classification Search
CPC .................. H04L 63/0236; H04L 63/0428
See application file for complete search history.

(56) References Cited

U.S. PATENT DOCUMENTS

| | | | |
|---|---|---|---|
| 6,317,831 B1* | 11/2001 | King | H04L 9/0827 713/171 |
| 7,376,831 B2 | 5/2008 | Kollmyer | |
| 9,288,272 B2 | 3/2016 | Thomas | |
| 10,250,579 B2 | 4/2019 | Guo | |
| 10,616,101 B1* | 4/2020 | Peterson | H04L 47/12 |
| 2004/0177274 A1* | 9/2004 | Aroya | H04L 63/0236 726/13 |
| 2005/0283462 A1 | 12/2005 | Pennec | |

(Continued)

OTHER PUBLICATIONS

"Can an attacker "simulate" a private IP address?", edited Jun. 27, 2015, StackExchange, Information Security, 7 pps., <https://security.stackexchange.com/questions/92526/can-an-attacker-simulate-a-private-ip-address>.

(Continued)

*Primary Examiner* — Vance M Little
(74) *Attorney, Agent, or Firm* — Ken Han; Andrew M. Calderon; Roberts Calderon Safran & Cole, P.C.

(57) ABSTRACT

A method for controlling the transfer of data through a firewall. The method includes one or more computer processors establishing a first communication channel between a first server and a second server. The method further includes transmitting, via the first communication channel, information related to a pending transmission of data from the first server to the second server. The method further includes receiving from the second server, via the first (Continued)

communication channel, a set of security information associated with accessing the second server via a second communication channel. The method further includes establishing the second communication channel between the first server and the second server based on the set of security information received from the second server. The method further includes transmitting the data from the first server to the second server utilizing the established second communication channel.

17 Claims, 4 Drawing Sheets

(56) References Cited

U.S. PATENT DOCUMENTS

| | | | | |
|---|---|---|---|---|
| 2008/0104262 | A1* | 5/2008 | Katz | H04L 63/1458 |
| | | | | 709/229 |
| 2008/0115202 | A1 | 5/2008 | McKay | |
| 2010/0011115 | A1 | 1/2010 | Kliland | |
| 2015/0073992 | A1* | 3/2015 | Weiner | G06Q 20/40 |
| | | | | 705/44 |
| 2016/0034961 | A1* | 2/2016 | May | H04W 4/021 |
| | | | | 705/14.58 |
| 2016/0165649 | A1* | 6/2016 | Polo | H04L 63/0492 |
| | | | | 455/411 |
| 2017/0351481 | A1* | 12/2017 | Raphael | H04W 4/21 |
| 2020/0162916 | A1* | 5/2020 | Kumar | H04L 1/1678 |
| 2020/0195658 | A1* | 6/2020 | Chien | H04L 63/083 |

OTHER PUBLICATIONS

"Layered, Full Lifecycle Cloud Native Security Platform", Aqua, Copyright © 2020 Aqua Security Software Ltd., 16 pps., <https://www.aquasec.com/products/aqua-cloud-native-security-platform/>.

"Quick Blind TCP Connection Spoofing with SYN Cookies", Jakob Lell's Blog, Aug. 13, 2013, 11 pps., <https://www.jakoblell.com/blog/2013/08/13/quick-blind-tcp-connection-spoofing-with-syn-cookies/>.

"Secure your management ports with just-in-time access", Feb. 25, 2020, Microsoft Azure, 23 pps., <https://docs.microsoft.com/en-us/azure/security-center/security-center-just-in-time>.

Bhartiya, "How To Securely Transfer Files Between Servers With Scp", Linux.com, Feb. 28, 2017, 3 pps., <https://www.linux.com/tutorials/how-securely-transfer-files-between-servers-scp/>.

Son et al., "Firewall traversal by cooperative on-demand opening", HPDC-14, Proceedings 14th IEEE International Symposium on High Performance Distributed Computing, 2005, pp. 233-242. IEEE, 2005.

* cited by examiner

MULTI-CHANNEL BASED JUST-IN-TIME FIREWALL CONTROL

BACKGROUND OF THE INVENTION

The present invention relates generally to the field of computer security, and more particularly to utilizing features of a firewall to dynamically control the access to network ports based on information obtained from a different network.

Servers or daemons executing on computer systems can "listen" to network communication ports of a computer/server protected by a firewall for communication connection attempts by clients (e.g., systems, devices, etc.) from outside a firewall-secured domain in an effort to protect the computer system/server. The protected computer system/server needs the firewall to open the network-facing ports or for the firewall to forward network communications or the protected computer/server would wait indefinitely for communications from external clients. Therefore, firewalls are usually configured to allow incoming traffic to servers on specific, well-known ports. For example, with respect to utilizing a file transfer protocol (FTP) protocol in active mode, the FTP host listens to a random and temporary non-privileged port to identify communication attempts by clients by at least determining the Internet protocol (IP) address or "dot" address of a client. Connection attempts from outside the firewall protected system, if not explicitly allowed, such as within a whitelist, are blocked. A whitelist may include specific allowable IP addresses and corresponding ports IDs. Alternatively, or in addition to, a whitelist can also include ranges of IP addresses and/or ranges of port IDs that are allowed to initiate network communication through a firewall.

SUMMARY

According to an aspect of the present invention, there is a method, computer program product, and/or system for controlling the transfer of data through a firewall. In an embodiment, the method includes at least one computer processor establishing a first communication channel between a first server and a second server. The method further includes at least one computer processor transmitting, via the first communication channel, information related to a pending transmission of data from the first server to the second server. The method further includes at least one computer processor responding to transmitting the information related to the pending transmission of the data from the first server to the second server, by receiving from the second server, via the first communication channel, a set of security information associated with accessing the second server via a second communication channel. The method further includes at least one computer processor establishing the second communication channel between the first server and the second server based on the set of security information received from the second server. The method further includes at least one computer processor transmitting the data from the first server to the second server utilizing the established second communication channel.

DETAILED DESCRIPTION

Figure 1:
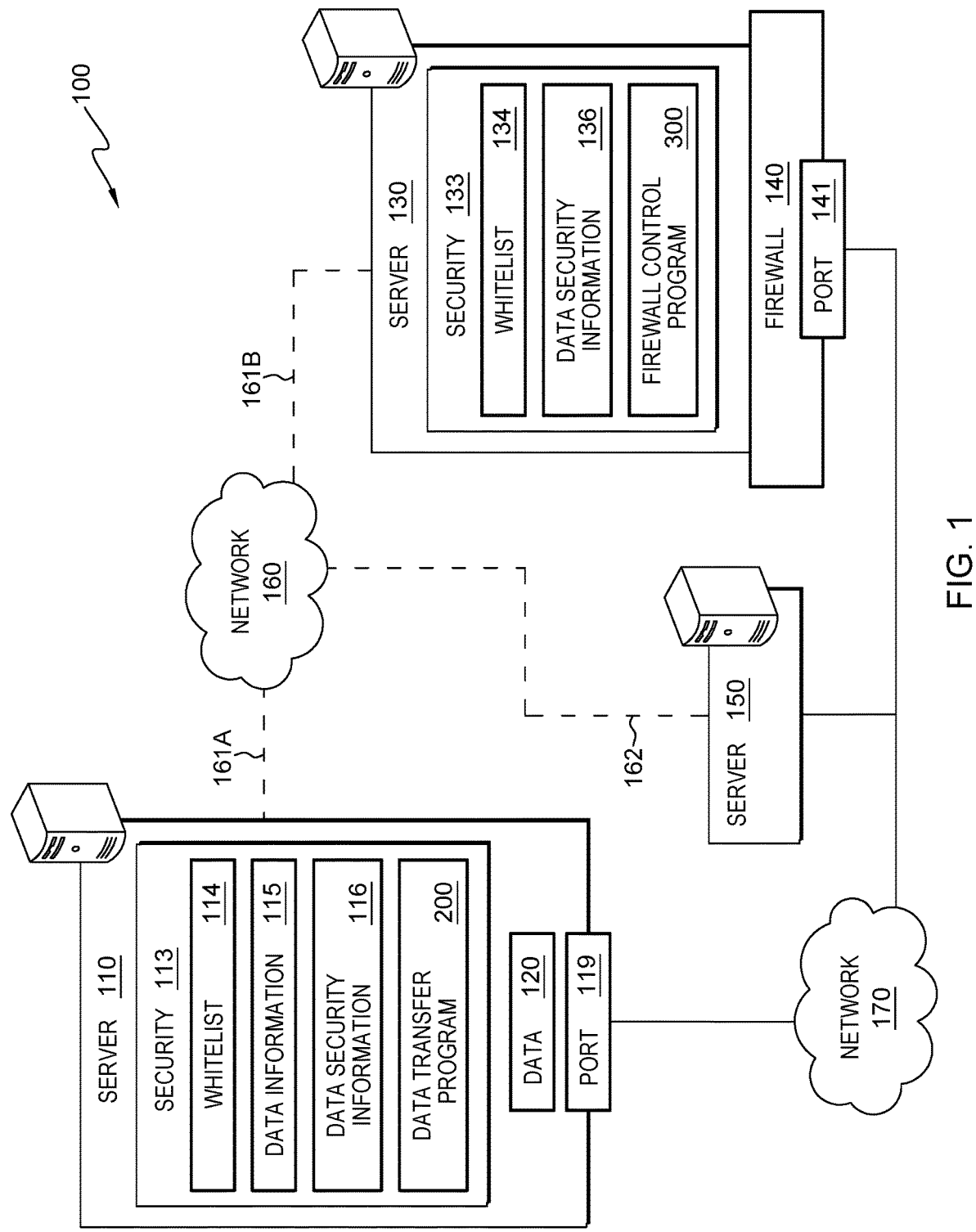
FIG. 1 illustrates a networked-computing environment, in accordance with an embodiment of the present invention.

Embodiments of the present invention recognize that current security requirements dictate that firewall ports of a computer system are kept closed, unless a port needs to be opened for legitimate network communications. Further, the time (i.e., duration) that the firewall port remains open should be constrained to avoid external attacks while the firewall port is open but legitimate network communications are not occurring.

Embodiments of the present invention recognize that some solutions to this problem utilize firewalls configured to allow selected ports to receive inbound traffic from whitelisted (e.g., approved) Internet protocol (IP) addresses and/or a range of IP addresses. Subsequently, the firewall port automatically closes after given network communication session ends or a communication timeout duration expires. However, embodiments of the present invention also recognize that because cloud-computing systems and hosted applications, such as Internet-based businesses utilize networks that have public-facing gateways, which service requests from the external clients, firewalls associated with the cloud-computing systems and Internet hosted application are vulnerable to IP spoofing attacks or attacks prior to the firewall closing the port.

Embodiments of the present invention also recognize that in a data processing era where container-based cloud-computation is prevalent, network communications between cloud-hosted servers can include the outputs of containers and messages for subsequent units of container-hosted applications to start executing, in addition to the data that is transferred. Therefore, the requirements of keeping firewall ports open covers a broader scope of network activity than historic client-server communications controlled through a firewall.

Embodiments of the present invention utilize multiple channels, communication paths, and/or networks to (i) negotiate a communication exchange between servers and (ii) establish network communications through a firewall. Embodiments of the present invention utilize an ad hoc network as to negotiations for a pending transfer of data via other communication channel. The ad hoc network is utilized to exchange information related to a pending transfer of data from between one computing entity (e.g., a client device, a system, or a source server), and receive a set of security information from target server protected by a firewall. Embodiments of the present invention control the opening of firewall ports of target servers within the same physical data center by dictating: a time when a firewall port will open, a duration that the firewall port will remain open, the address of the port sending the data. The set of security information also includes an ID token related to the negotiated transfer of data. The ID token obtained during the communication negotiations via the ad hoc network is utilized to negotiate the transfer between servers rather than authenticating utilizing credentials. The established network link between the servers can include bi-directional transfers of data.

Various embodiments of the present invention improve the security of the data transfer by utilizing "on-the-fly" (i.e., in preparation for transmission) encryption of packets of data at the source/requesting server utilizing an encryption key included within the set of security information obtained during the communication negotiations between the server protected by the firewall to the computing entity requesting to send data to a program or data resource of target server protected by a firewall. Embodiments of the present invention can also include an "end-of-transfer" message or flag within a data header of the last data packet of the transferred data to indicate to close the firewall port as opposed to waiting to close the firewall port in response to a time-based security dictate. Other embodiments of the present invention can be implemented in association with a network that utilizes multi-path communications to increase bandwidth.

Some embodiments of the present invention are constrained to operate among servers and firewalls that are within the same physical data center based on the communication technology that generates a hyperlocal ad hoc network (e.g., a non-data transferring channel), utilizing wireless communications, such as Bluetooth™, 3G/4G/5G technologies; another local Ethernet network; or another network among the servers of the datacenter utilized for functions other than data transfer, such as a network associated with system management functions. Based on the wireless communication technology utilized to generate the ad hoc network (e.g., communication channel), embodiments of the present invention can utilize features of the wireless technology, such as within 5G technology to further secure that information associated with the transfer of data and the set of security information.

Further embodiments of the present invention can utilize other communications technologies to establish an ad hoc network that can operate between servers and/or data centers at differing geographic locations. For example, the ad hoc network utilized to initiate the network communication negotiations and the transfer of security information can be established between a requesting server and a first mobile device, a telecommunication system that connects the first mobile device to a second mobile device in proximity to the target server, and a communication link between the second mobile device and the target server.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating networked-computing environment 100, in accordance with embodiments of the present invention. In an embodiment, networked-computing environment 100 includes, server 110, and server 130, and server 150 all interconnected over network 170. In one embodiment, networked-computing environment 100 represents a portion of a data center within a single physical location. In addition, networked-computing environment 100 also includes one or more instances of network 160 (e.g., an ad hoc network), which is a network different from network 170. In some embodiments, elements 161A, 161B, and 162 represent dynamic connections and communication paths respectively associated with server 110, server 130, server 150, and network 160 (i.e., the ad hoc network).

Server 110, server 130, and server 150 may be personal computers, desktop computers, mainframe computers, etc. In certain embodiments, server 110 and server 130 represent a computer system utilizing clustered computers and components (e.g., database server computers, application server computers, etc.) that act as a single pool of seamless resources when accessed through network 170, as is common in data centers and with cloud-computing applications. In general, server 110, server 130, and server 150 are representative of any programmable electronic device or combination of programmable electronic devices capable of executing machine readable program instructions and communicating via network 170. Server 110, server 130, and server 150 may include components, as depicted and described in further detail with respect to FIG. 4, in accordance with embodiments of the present invention.

In an embodiment, server 110 represents a computing entity, such as a computing system, a hosted server, a virtual input/output server (VIOS), or a cloud service that requests to transmit at least data to a target server. Server 110 may also communicate other outputs and messages to the target server related to the received information; and in response receive results and/or messages from the target server, such as server 130 related to the received information.

Server 110 includes security 113, one or more instances of port 119 (i.e., network communication ports), data 120, and a plurality of other programs and data (not shown). Other programs and data may include an operating system, a system management facility, a database management system, network and communication programs, N_Port virtualization software, programs of a plurality of users (e.g., organizations, enterprises, etc.), a plurality of files and/or databases, etc. In some embodiments, server 110 also includes other hardware elements (not shown), such as one or more wireless communication adapters, cryptographic accelerators, and/or network adapters that include cryptographic features. In another embodiment, server 110 further includes a hardware-based and/or software-based firewall (not shown) that includes one or more instances of port 119 connected to network 170.

Security 113 represents a suite of security functions and data utilized by server 110. In an embodiment, security 113 includes whitelist 114, data information 115, data security information 116, data transfer program 200, and a plurality of other programs and data (not shown). For example, other programs and data included within security 113 may also include access control software, log management software, encryption/decryption algorithms, an authentication program, one or more databases, etc. In some embodiments, security 113 also includes a network address translation (NAT) facility/table, a blacklist of excluded IP and/or port addresses; credentials, access tokens, etc., (not shown) utilized by server 110. In various embodiments, aspects of security 113 control network communication access related to one or more instances of port 119.

In various embodiments, one or more aspects of security 113 interface/control a firewall (not shown) of server 110 that includes instances of port 119. In a further embodiment, security 113 interfaces with and/or controls hardware elements (not shown) of server 110, such as coherent accelerator processor interface (CAPI) or non-volatile memory express host controller (NVMe)-based adapters that can perform direct memory access (DMA) or other functions without utilizing an operating system of server 110.

In one embodiment, whitelist 114 identifies computing entities that are assigned a particular privilege, service, and/or access authority. Approved entities included within whitelist 114 may be identified and/or allowed based on an entity (e.g., server) name, an IP address of an entity, a range of IP addresses, a respective port ID, a range of respective port IDs, etc. For example, whitelist 114 may include a combination of IP addresses and port IDs (e.g., physical ports, virtual ports, or a combination thereof) to support multi-path data transfer between server 110 and server 130. In some embodiments, whitelist 114 includes additional information related to one or more computing entities that can indicate whether the target computing entity allows negotiating network communications via network 170, or dictates negotiating network communications via another communications method, such as an ad hoc network (e.g., network 160). For example, whitelist 114 flags server 130 as dictating utilizing data transfer program 200 to negotiate and establish network communications between server 110 and server 130.

Data information 115 includes information respectively associated with instances of data 120, such as a size of data 120, a data type/format (e.g., extent-based, an object-based, file system-based, etc.) of data 120, identifying a program that created data 120, data transfer rates (e.g., estimated, actual, a bandwidth range, etc.) associated with an instance of network 170 and a target server (e.g., server 130) based on previous transfers of data and other communications, etc. In some embodiments, data information 115 also includes a dictate associated with utilizing an encryption algorithm to dynamically encrypt packets of data 120 prior to transmission utilizing an encryption key associated with data 120 and included within data security information 116.

In another embodiment, data information 115 also includes other information related to data 120, and the program and/or the computing entity that generates data 120. In one example, data information 115 may also include an indication to provide one or more programs associated with server 110 a received result, a message, and/or a status in response to transmitting data 120 to server 130; an indication that other responses, messages, and/or commands are exchanged among computing entities executing within server 110 and server 130; etc. In another example, data information 115 includes security information associated with an instance of data 120 and/or the program that generated or modified data 120, such as authentication information, credentials, certificates and/or passwords associated with one or more programs or users of data 120, a timestamp correspond to a request to communicate data 120 to server 130.

In an embodiment, data security information 116 includes a set of security information received from server 130 that is associated with transmitting data 120 to server 130 via network 170. In one embodiment, data security information 116 includes sets of security information respectively associated with an instance of data 120 and a network request by server 110. A set of security information may include: an ID token corresponding to a network communication request, an IP address and port ID (e.g., a port-pair) corresponding to port 141, timestamp delta or a time when firewall 140 opens port 141 to receive data packets of data 120 from server 110 utilizing network 170, a duration that port 141 remains open, a transmission protocol to utilize to transmit packets of data 120 from server 110 to server 130, etc. Data security information 116 may also include a pre-determined flag or metadata to include (e.g., embed) within a header of a final data packet of data 120 that indicates an "end-of-transfer" condition to server 130.

In another embodiment, data security information 116 also includes a timestamp respectively associated with set of information received from server 130 for a respective communication request. In some embodiments, data security information 116 further includes a dictate associated with an encryption algorithm utilized to dynamically encrypt data 120 and an encryption key to apply to packets of data 120 utilizing the dictated encryption algorithm.

Port 119 is representative of one or more communication/network ports included within server 110. Port 119 is further associated with a port ID, a port address, an N_port ID, or another identifier. Port 119 is also associated with an IP address of server 110. In various embodiments, port 119 is assigned to a computing entity within server 110 via a NAT facility. In some embodiments, one or more aspects of security 113 can control network access and communications through port 119.

Data transfer program 200 is a program that utilizes and/or generates an ad hoc network to negotiate transmitting data between two servers, where at least a target server includes network communication ports protected by a firewall. In various embodiments, data transfer program 200 generates and/or utilizes an ad hoc network (e.g., network 160) to interface a target server and a respective instance of firewall control program 300 executing on the target server (e.g., server 130) to negotiate transmitting data 120 to the target server. For example, data transfer program 200 receives a set of security information (i.e., data security information 116) generated by firewall control program 300 and other tasks to prepare to communicate at least data 120 from server 110 to server 130 utilizing another network 170.

In another embodiment, data transfer program 200 utilizes a set of security information received from firewall control program 300 executing on server 130 to initiate transmitting data 120 to server 130, such as opening port 119, transmitting an identifier (ID) token related to a network communication session on or after a dictated timestamp within the set of security information; and in response to server 130 accepting the IT token, transmitting data 120. In some embodiments, data transfer program 200 also utilizes an encryption key included within the received set of security information to encrypt packets of data 120 "on-the-fly" (e.g., in real-time) to server 130. In an embodiment, if server 110 also includes a firewall program, then data transfer program 200 utilizes security 113 to perform one or more additional requesting server (i.e., server 110) actions associated with a firewall (not shown) that includes port 119, such as allowing receipt of results, messages, and/or other communications from server 130.

Server 130 represents a computing entity, such as a computing system, a hosted server, a VIOS server, network-attached storage, or a cloud computing service/resource. Server 130 includes security 133, firewall 140 and a plurality of other programs and data (not shown). Other programs and data may also include various one or more operating systems; a system management facility; a database management program; databases; communication programs; N_Port virtualization software; a plurality of software and applications of users, organizations, and/or enterprises, etc.

Security 133 represents a suite of security functions and data utilized by server 130. In an embodiment, security 133 includes whitelist 134, data security information 136, firewall control program 300, and a plurality of other data, programs, and/or algorithms (not shown). For example, other programs and data included within security 133 may also include one or more programs previously identified with respect to security 113. In some embodiments, security 133 also includes a NAT facility/table, a blacklist of excluded computing entities, IP addresses, IP address ranges, port addresses, and/or port address ranges; a certificate list; an encryption key generation program; an authentication program; an ID token generation program; etc., utilized by server 130. In another embodiment, security 133 also includes an instance of data transfer program 200 that server 130 utilizes to negotiate network communications with a server different from server 110, such as server 150. In other embodiments, an aspect of security 113 enables an administrator or analyst associated with at least server 130 to maintain and/or modify whitelist 134 and a blacklist (not shown) of server 130.

In various embodiments, some aspects of security 133 control one or more features of firewall 140, such a port 141. In one example, security 133 interfaces with firewall 140 to open and close port 141 based on one or more dictates or events, such responding to a command associated with a timestamp or detecting an end-of-transfer flag within a received data packet. In another example, security 133 can include a NAT feature that redirects communications received at port 141 to a computing entity associated with server 130 based on information associated with the requesting server (e.g., server 110) and/or a program executing on the requesting server.

In an embodiment, whitelist 134 includes types of information previously discussed with respect to whitelist 114. Whitelist 134 includes one or more lists, tables, and/or databases identifying computing entities within network computing environment 100 that can access server 130 via a network communication port of firewall 140, such as port 141. In some embodiments, whitelist 134 includes further details or dictates related to a computing entity that can access server 130 and/or a computing resource or computing entity hosted or protected by server 130. In one example, whitelist 134 may dictate that server 150 is restricted to access server 130 through a constrained range of port IDs. In another example, whitelist 134 includes a redirect flag that dictates that one group of IP addresses and/or computing entities are to utilizes an ad hoc network to negotiate communications via network 170, while another group of one group of IP addresses and/or computing entities can directly establish network communication via network 170. In various embodiments, one or more aspects of security 133 utilizes whitelist 134 to control access and/or network communications through firewall 140.

Data security information 136 includes a plurality of information associated with establishing and securing network communications between two servers. In one embodiment data security information 136 includes information associated with establishing network communications between server 110 and server 130 to communicate data 120 based on information obtained from data transfer program 200 via network 160. Data security information 136 includes information received from data transfer program 200, previously discussed with respect to data information 115 and data security information 116. Firewall control program 300 can utilize information received to data security information 136 to generate various determinations and responses.

In various embodiments, data security information 136 includes information determined by firewall control program 300 or generated by an aspect of security 133, such as an ID token corresponding to the request to communicate data 120 to server 130 via network 170, timestamp indicating when server 130 will open port 141 for network communications, a maximum time duration that port 141 remains open, a dictate identifying an encryption algorithm that server 110 utilizes for real-time encryption of data packets of data 120, a pair of encryption keys corresponding data 120 for a given network communication session, etc.

In another embodiment, data security information 136 also includes information associated with one or more programs and/or processes related to data 120, such as an entity associated with server 130 that receives data 120; dispositioning results generated by the entity associated with server 130 that receives data 120; other communications related one or more subsequent actions associated with server 130 receiving data 120, such as a message to another containerized unit to begin executing.

Firewall control program 300 is a program that controls access to a server (i.e., a target server) through network communication ports protected by a firewall based on at least two servers exchanging information via an ad hoc network, such as information related to the data to communicate to the target server and a set of security information or dictates sent to the requesting server. In one embodiment, firewall control program 300 determines that server 110 requests to establish network communication with server 130 based on information received over an ad hoc network, such as network 160. In another embodiment, server 130 or firewall 140 refuses network communication requests initiated over network 170. In response, firewall control program 300 instructs server 110 to execute data transfer program 200 and utilize an ad hoc network to negotiate network communications between server 110 and server 130.

In various embodiments, firewall control program 300 generates a set of security information based on a communication request received from a requesting server (i.e., server 110) that uses data transfer program 200 to negotiate network communications with server 130. For example, firewall control program 300 generates and transmits a set of security information to server 110 that includes an ID of a firewall port to receive data, a time when the firewall port will open, a maximum time duration that the firewall port is open, an ID token indicating that server 110 can establish a network connection to server 130, an encryption algorithm and related encryption key utilized to encrypt data packets of data 120 from server 110 to network 170, etc.

Firewall 140 represents a hardware-based and/or software-based firewall that protects server 130 from unauthorized incoming network traffic from network 170 via one or more physical or virtual ports, such as port 141. In an embodiment, network access through firewall 140 and port 141 in controlled by aspects of security 133 and/or firewall control program 300.

Port 141 represents a physical or virtual communication port (e.g., connection) associated with communications related to network 170. In an embodiment, port 141 is associated with an IP address corresponding to server 130 and further associated with one or more port IDs. In various embodiments, a NAT facility (not shown) within server 130 maps port 141 to computing entities within and/or protected by server 130.

Server 150 is representative of another computing system, server, storage area network, networked-attached storage system, cloud storage environment, etc., within a data center associated with network computing environment 100 (e.g., a data center). In an example, server 150 is not included within whitelist 114.

Network 160 is representative of a network or a communication channel (e.g., a non-data transferring channel) different from network 170. In various embodiments, network 160 is an ad hoc network that is utilized to negotiate network communications between a requesting server and a target server prior transmitting data and/or other communication between the requesting server and the target server. A daemon or other program executing on the target server, such as server 130 detects the communication request and forwards the request to a security function of the target server. In an embodiment, in response to data transfer program 200 negotiating network communications between server 110 and server 130, network 160 communicates a set of security information from firewall control program 300 of server 130 to data transfer program 200 of server 110.

In some embodiments, network 160 is a hyperlocal network that is constrained by a physical distance between server 110, server 130, and/or other factors, such as shielding and/or electrical interference impose limitations on an instance of network 160 in addition to lacking public-facing gateways. In one example, network 160 is a hyperlocal/distance limited wireless ad hoc network (WANET) that is dynamically generated. Network 160 is constrained to operate among servers within the same physical data center, such as server 110 and server 130. In one scenario, network 160 is based on wireless communications, such as Bluetooth™, 3G/4G/5G technologies. Based on the wireless communication technology utilized to generate the network 160, features associated with the wireless technology, such as within 5G technology can further secure that information transfer across network 160. In another scenario, network 160 can be based on other communication technologies, such as near field communication (NFC), lasers, infrared systems, ultrasonic systems, etc.

In other embodiments, network 160 is a LAN associated with an Ethernet server or other communication fabric within a data center that lacks public-facing network gateways. For example, network 160 is a network within networked-computing environment 100 that is used for communications other than data transfer among executing programs, computing entities, and/or data sources, such as a system management facility or a virtual LAN (VLAN) among hardware elements. In further embodiment, network 160 utilizes one or more intermediate devices that can respectively interface with server 110 and/or server 130. In addition, each intermediate device and communication link of network 160 includes security measures that prevent network 160 from including any public-facing access points. In an example, network 160 may be associated with a pair of mobile devices and a cellular network that including secured communications that can operate across greater distances, such as between data centers.

In one embodiment, server 110 communicates through network 170 to server 130 and server 150. Network 170 can be, for example, a local area network (LAN), a wide area network (WAN), such as the Internet, a telecommunications network (e.g., a portion of a cellular network), a wireless local area network (WLAN), such as an intranet, or any combination of the previous and can include wired, wireless, or fiber optic connections. In general, network 170 can be any combination of connections and protocols that will support communications between server 110, server 130, and server 150, in accordance with embodiments of the present invention. In various embodiments, network 170 operates locally via wired, wireless, or optical connections and can be any combination of connections and protocols (e.g., personal area network (PAN), near field communication (NFC), laser, infrared, ultrasonic, etc.).

Figure 2:
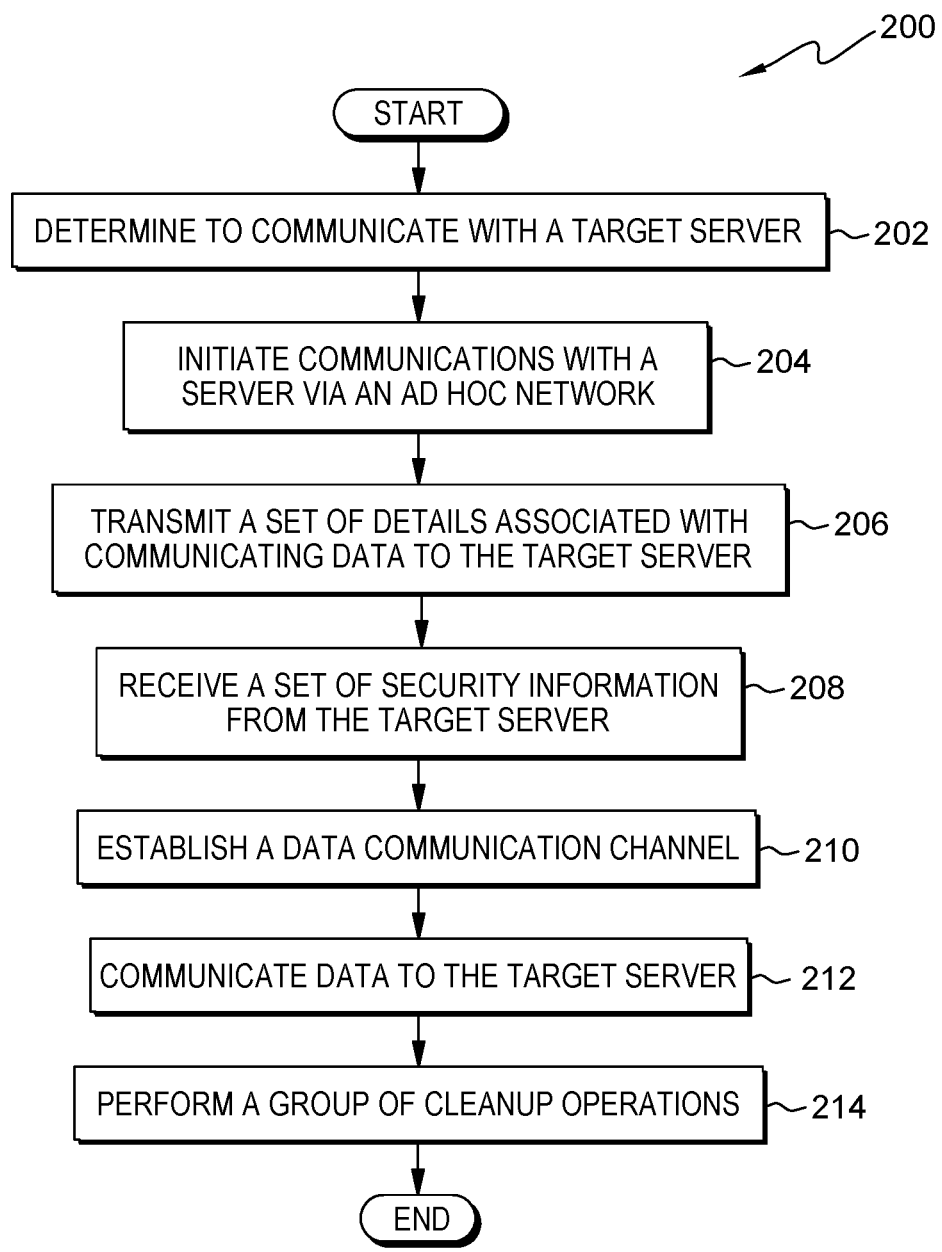
FIG. 2 depicts a flowchart of steps of a data transfer program, in accordance with an embodiment of the present invention.

FIG. 2 is a flowchart depicting operational steps for data transfer program 200, a program for generating and/or utilizing an ad hoc network to negotiate network communications and obtain security information from a target server and to communicate data via different network, in accordance with embodiments of the present invention. In one embodiment, data transfer program 200 executes in response to determining to transfer data to a server flagged within whitelist 114 as having additional firewall controls. In other embodiments, data transfer program 200 executes in response to server 130 rejecting to negotiate network communications and/or transfers of data utilizing standard network protocols or "handshaking."

In step 202, data transfer program 200 determines to communicate with a target server. In one embodiment, data transfer program 200 determines to communicate with a target server (i.e., server 130) based on a user or a program that generates data 120. In another embodiment, data transfer program 200 determines to communicate with server 130 based on server 110 receiving a request to transfer data 120 to server 130. For example, a program (not shown) executing on server 150 dictates that server 110 transmits a copy of data 120 to another program (not shown) executing within server 130.

In step 204, data transfer program 200 initiates communications with a server via an ad hoc network. In one embodiment, if server 110 cannot negotiate network communications with server 130 utilizing standard protocols and/or handshaking (e.g., server 130 refuses communications with server 110 via network 170), then data transfer program 200 initiates communications with the server 130 via an ad hoc network (i.e., network 160). In another embodiment, 200 initiates communications with server 130 via an ad hoc network based on information (e.g., a dictate) included within whitelist 114.

In various embodiments, prior to initiating communications with a server via an ad hoc network data transfer program 200 utilizes whitelist 114 to verify an identity of the target server (i.e., server 130). For example, data transfer program 200 verifies that server 130 is included within whitelist 114 and is the target for the communication request and establishes network connections 161A and 161B. Server 150 is not included within whitelist 114; therefore, data transfer program 200 does not establish network connection 162.

In some embodiments, data transfer program 200 initiates communications with server 130 by generating network 160, such as activating a short-range wireless communication device (not shown) operatively connected to server 110 and broadcasting a request. In an embodiment, data transfer program 200 can utilize intermediate wireless devices and a telecommunication system to generate network 160. In other embodiments, data transfer program 200 initiates communications with server 130 via an instance of network 160 based on a network within networked-computing environment 100 that does not have external public network gateway, such as an Ethernet-based Intranet, a VLAN, a system management network, etc.

In step 206, data transfer program 200 transmits a set of details associated with communicating data to the target server. Data transfer program 200 transmits a set of details associated with communicating data 120 data and/or other network communications associated with server 110 and server 130 to server 130 via network 160. In one embodiment, data transfer program 200 transmits data included within data information 115. In some embodiments, data transfer program 200 includes additional information within the set of details associated with communicating data 120 to server 130, such as a port-pair or respective IDs corresponding to one or more instances of port 119 that communicate though network 170 to server 130, a flag or metadata within the last packet of data 120 indicating an "end-of-transfer" condition, identifying one or more subsequent actions associated with communicating data 120 to server 130, etc. In addition, data transfer program 200 may utilize an aspect of security 113 to reserve and/or assign port 119 to the process related to communicating data 120 to server 130.

In step 208, data transfer program 200 receives a set of security information from the target server. In an embodiment, in response to data transfer program 200 transmitting a set of details associated with communicating data 120 to server 130, data transfer program 200 receives, via network 160, a set of security information generated by firewall control program 300 executing within server 130. Data transfer program 200 may store some or all of the received set of security information within data security information 116.

In various embodiments, data transfer program 200 utilizes the received set of security information to prepare server 110 to communicate data 120 to server 130. In one example, if data transfer program 200 determines that packets of data 120 are encrypted in real-time, then data transfer program 200 identifies the encryption algorithm to utilize and the encryption key received from server 130 to encrypt the packets of data 120 for transmission. In another example, data transfer program 200 utilizes an aspect of security 113 to reserve port 119 for communications related to data 120, server 130, and network 170.

In step 210, data transfer program 200 establishes a data communication channel. In various embodiments, data transfer program 200 utilizes network 170 to establish another communication channel between server 110 and server 130. Data transfer program 200 opens port 119 at a time dictated within the received set of security information stored within data security information 116. Subsequently, data transfer program 200 transmits a network communication request via network 170 to the IP address of server 130 and port address corresponding to port 141, after the dictated time. Data transfer program 200 also transmits the ID token included within the received set of security information utilizing a pre-defined protocol. In another embodiment, data transfer program 200 establishes network communications between server 110 and server 130 via network 170 by including the received ID token within a header associated with a first encrypted packet associated with data 120 that is transmitted to the IP address of server 130 after the time dictated within the received security information.

In step 212, data transfer program 200 communicates data with the target server. In an embodiment, in response to establishing network communications between server 110 and server 130 utilizing network 170, data transfer program 200 utilizes the dictated encryption algorithm and the received encryption key to encrypt a copy of data 120 (e.g., data packets of data 120) "on-the-fly" (e.g., in real-time). In some embodiments, data transfer program 200 can also exchange other data, communications, and/or messages between server 110 and server 130, such as receiving one or more results related to data 120 from server 130, initiating an action associated data 120 with another computing entity (e.g., program, container, etc.) within a server accessible via network 170, etc.

In various embodiments, data transfer program 200 includes metadata and/or a flag in the last packet of data corresponding to data 120 with an "end-of-transfer" indication. In another embodiment, data transfer program 200 determines that based on the bandwidth of the communication channel and delays associated with network 170 that transmitting data 120 will not complete transferring before port 141 closes. In response data transfer program 200 utilize network 160 to interface server 130 to request that firewall control program 300 override the maximum time that port 141 remains open (e.g., prevent access from expiring).

In step 214, data transfer program 200 performs a group of cleanup operations. In an embodiment, data transfer program 200 performs a set of cleanup operations related to server 110. In one scenario, data transfer program 200 performs cleanup operations related to communicating data with server 130, such a closing port 119; releasing port 119 for reuse, deleting some or all of data security information 116 corresponding to data 120; dispositioning data 120, updating data information 115 with information related to transferring date with server 130, such as a communication duration, a bandwidth or rate of data transfer, etc. In another scenario, data transfer program also performs other cleanup operations related to network 160, such as mapping ad hoc network links, updating whitelist 114 based on the mapped network links for network 160, verifying whether an IP address and/or port ID of a server different from server 130 is added to a blacklist, releasing and/or de-configuring network 160, etc.

Figure 3:
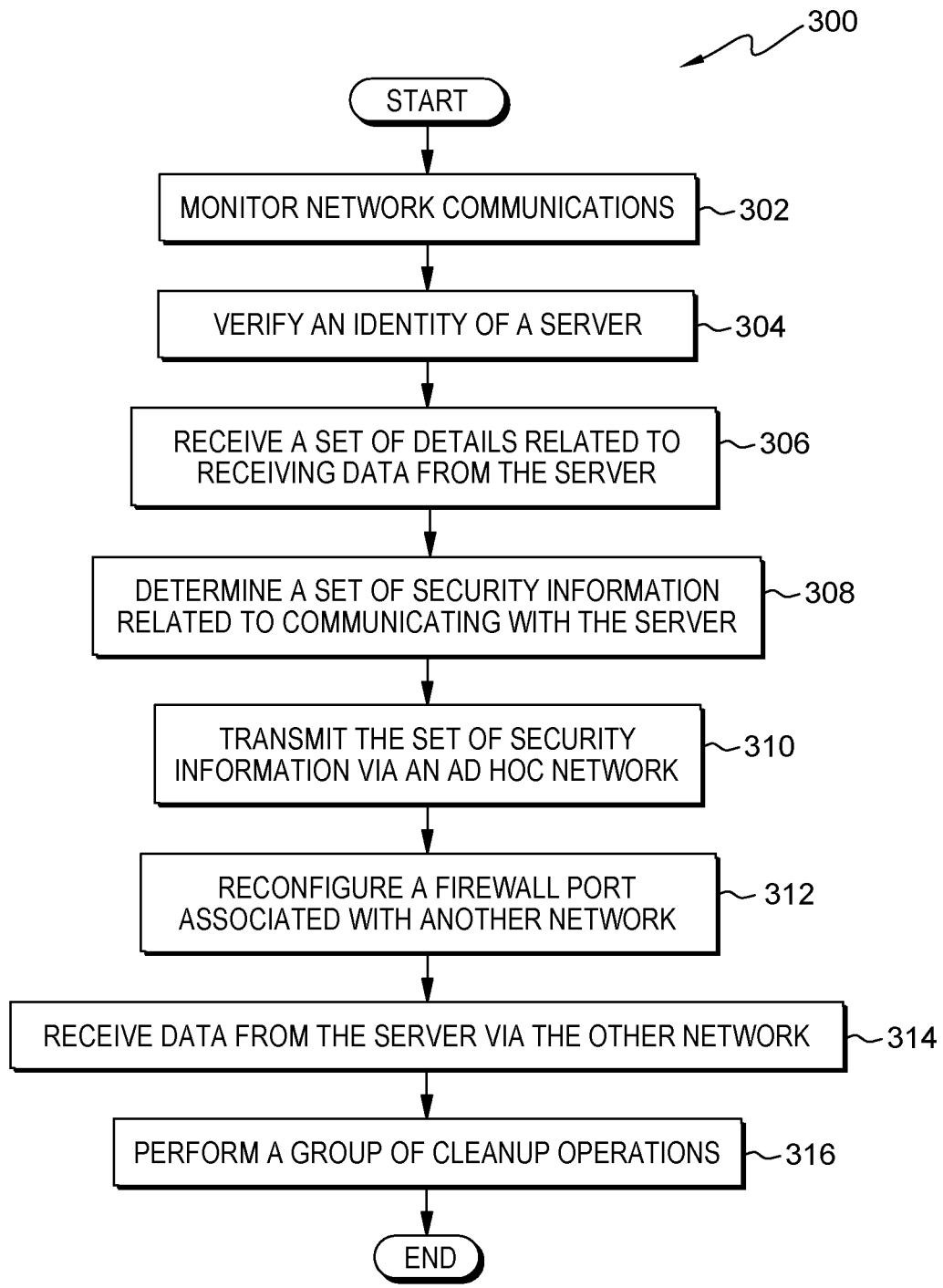
FIG. 3 depicts a flowchart of steps of a firewall control program, in accordance with an embodiment of the present invention.

FIG. 3 is a flowchart depicting operational steps for firewall control program 300, a program that dynamically controls the access of network communication through the firewall of a target computer. In various embodiments, firewall control program 300 negotiates network communications with that target computer over a network different from the network that transmits data and messages between the requesting computer and the target computer.

In step 302, firewall control program 300 monitors network communications. In one embodiment, firewall control program 300 utilizes a daemon or other communication function (not shown) of server 130 to monitor ad hoc networks, such as network 160 for network communication requests by server 110. In one scenario, firewall control program 300 scans for wireless communication signals associated with creating an ad hoc network and/or detecting activity within the ad hoc network. In another scenario, firewall control program 300 monitors network communications associated with an Ethernet system within networked-computing environment 100 that lacks an external public network gateway. In some scenarios, firewall control program 300 monitors other communication fabrics of networked-computing environment 100, such as a VLAN or a system management network for network communication requests from other servers, such as server 110.

In another embodiment, in response to firewall 140 rejecting or redirecting a request for network communications from a server flagged within whitelist 134, firewall control program 300 monitors and/or activates hardware (not shown) associated with server 130 that connects to an ad hoc network, such as network 160.

In step 304, firewall control program 300 verifies an identity of a server. In an embodiment, firewall control program 300 determines identifying information, such as IP address, port ID, etc., of a server that communicates a network communication request via an ad hoc network (i.e., network 160). Firewall control program 300 compares the information corresponding to the requesting server to information included within whitelist 134. If the information corresponding to the requesting server is included within whitelist 134, then firewall control program 300 interfaces with data transfer program 200 executing within the requesting server (i.e., server 110) via network 160. If the information corresponding to the requesting server is included within a blacklist (not shown), then firewall control program 300 terminates. Otherwise, firewall control program 300 request that an aspect of security 133 obtains additional information to determine whether server 110 is permitted to access server 130.

In step 306, firewall control program 300 receives a set of details related to receiving data from the server. In an embodiment, firewall control program 300 receives, via network 160 a set of details related to receiving data 120 (previously discussed with respect to data information 115) from server 110. In some embodiments, firewall control program 300 also receives, via network 160, other information and details related to data 120, such as a computing entity that receives a result from server 130 associated with data 120; messages and/or commands exchanged among computing entities executing within server 110 and server 130; etc. Firewall control program 300 may store one or more details related to receiving data 120 from server 110 within data security information 136.

In step 308, firewall control program 300 determines a set of security information related to communicating with the server. Firewall control program 300 stores the determined set of security information within data security information 136. In an embodiment, firewall control program 300 determines some elements of the set of security information related to receiving data 120 from server 110, such as an ID token corresponding the request by server 110 to communicate data 120 to server 130 via network 170, selecting a communication protocol, generating timestamp indicating when server 130 will open port 141 for network communications, determining an ID for port 141, etc. In various embodiments, firewall control program 300 also utilizes the received set of information corresponding to data 120 and information related to transmitting data 120 via network 170 to determine a maximum time duration that port 141 remains open. Firewall control program 300 may utilize various factors associated with network 170 to determine a maximum time duration for port 141, such as delays, bandwidth, a percentage of lost packets, etc.

In another embodiment, firewall control program 300 utilizes aspects of security 133 to determine other elements of information to include within the set of security information, such as identifying a dictate to utilize real-time encryption for data packets of data 120, selecting an encryption algorithm, generating a pair of encryption keys corresponding data 120 for a given network communication session with server 110, determining to detect an "end-of-transfer" flag within a data packet of data 120, etc. In other embodiments, firewall control program 300 also determines security information related to one or more programs and/or processes that are associated with data 120 and/or results generated by communicating data 120 to server 130. For example, firewall control program 300 may determine the IP address of another computing entity that receives one or more results related to data 120, a message to communicate to another containerized unit to begin executing in response to server 130 processing data 120, dispositioning data 120 after server 130 obtains a result, etc.

In step 310, firewall control program 300 transmits the set of security information via an ad hoc network. In an embodiment, firewall control program 300 transmits the set of security information to server 110 via network 160. For example, firewall control program 300 transmits a set of security information that includes an ID token, an indication of a network protocol, an IP address, a port ID or port number corresponding to port 141, a public encryption key, an indication of an encryption algorithm dictate, a timestamp when port 141 is open, and a maximum time duration that port 141 remains open. Firewall control program 300 may withhold (e.g., not transmit) some security information, such as the private key of the encryption key pair.

In step 312, firewall control program 300 reconfigures a firewall port associated with another network. In one embodiment, firewall control program 300 reconfigures firewall 140 to open port 141 for network communications from network 170 at a dictated timestamp included within data security information 136. Subsequently, firewall control program 300 determines whether further network communications are permitted based on a set of conditions, such as a first data packet received to port 141 corresponds to data 120, the data packets are received from the IP address and ID of port 119 corresponding to server 110, and the first data packet includes an ID token assigned to communications from server 110 to server 130 over network 170. Firewall control program 300 may utilize a NAT facility of server 130 to map communications received at port 141 to a computing entity within server 130 that utilizes data 120.

In another embodiment, if an ID token assigned to an IP address and port ID corresponding to server 110 is received at port 141, then firewall control program 300 instructs firewall 140 to open port 141 at a timestamp dictated within data security information 136. In various embodiments, firewall control program 300 also instructs an aspect of security 133 or firewall 140 to close port 141 (e.g., access expires) after a maximum time duration dictated within data security information 136 occurs unless an override is issued by firewall control program 300. In one example, firewall control program 300 issues a port access duration override based on requesting that server 110 retransmit one or more packets of data 120 that are not received or are corrupted. In another example, firewall control program 300 overrides the dictated duration based on receiving a message, via network 160, that data transfer program 200 indicates that server 110 includes un-transmitted data packets of data 120 within server 110.

In step 314, firewall control program 300 receives data from the server via the other network. In an embodiment, firewall control program 300 receives, via network 170, a plurality of data packets that comprise data 120. In some embodiments, firewall control program 300 decrypts the data packets corresponding to data 120 in near-real time. Firewall control program 300 utilizes a private key included within data security information 136 and a dictated algorithm for a given network communication sessions to decrypt data packets corresponding to data 120. In another embodiment, firewall control program 300 decrypts the packets of data 120 in near-real time to identify an "end-of-transfer" flag within a last data packet corresponding to data 120. In other embodiments, firewall control program 300 aggregates the plurality of received data packets of data 120 prior to decrypting data 120.

In various embodiment, firewall control program 300 performs one or more other actions in response to receiving data 120, such as transferring data 120 to another entity to process, storing data 120, communicating a result associated with data 120 to server 110, communicating other responses, messages, and/or commands among computing entities executing within server 110, server 130, and/or accessible via network 170.

In step 316, firewall control program 300 performs a group of cleanup operations. In an embodiment, firewall control program 300 performs a group of cleanup operations, such as closing port 141, dispositioning data 120, ceasing communications via network 160, deleting some or all of data security information 136, releasing port 141 for reuse by server 130, etc. Firewall control program 300 may close port 141 based on receiving an "end-of-transfer" flag within the last data packet of data 120 or based on a maximum access duration expiring for port 141. In some embodiments, firewall control program 300 updates a database that includes information related to data 120 and communications via network 170 that affects subsequent determinations by firewall control program 300, such as determining a data transfer rate between server 110 and server 130, network delays, packet loss percentages, etc.

Figure 4:
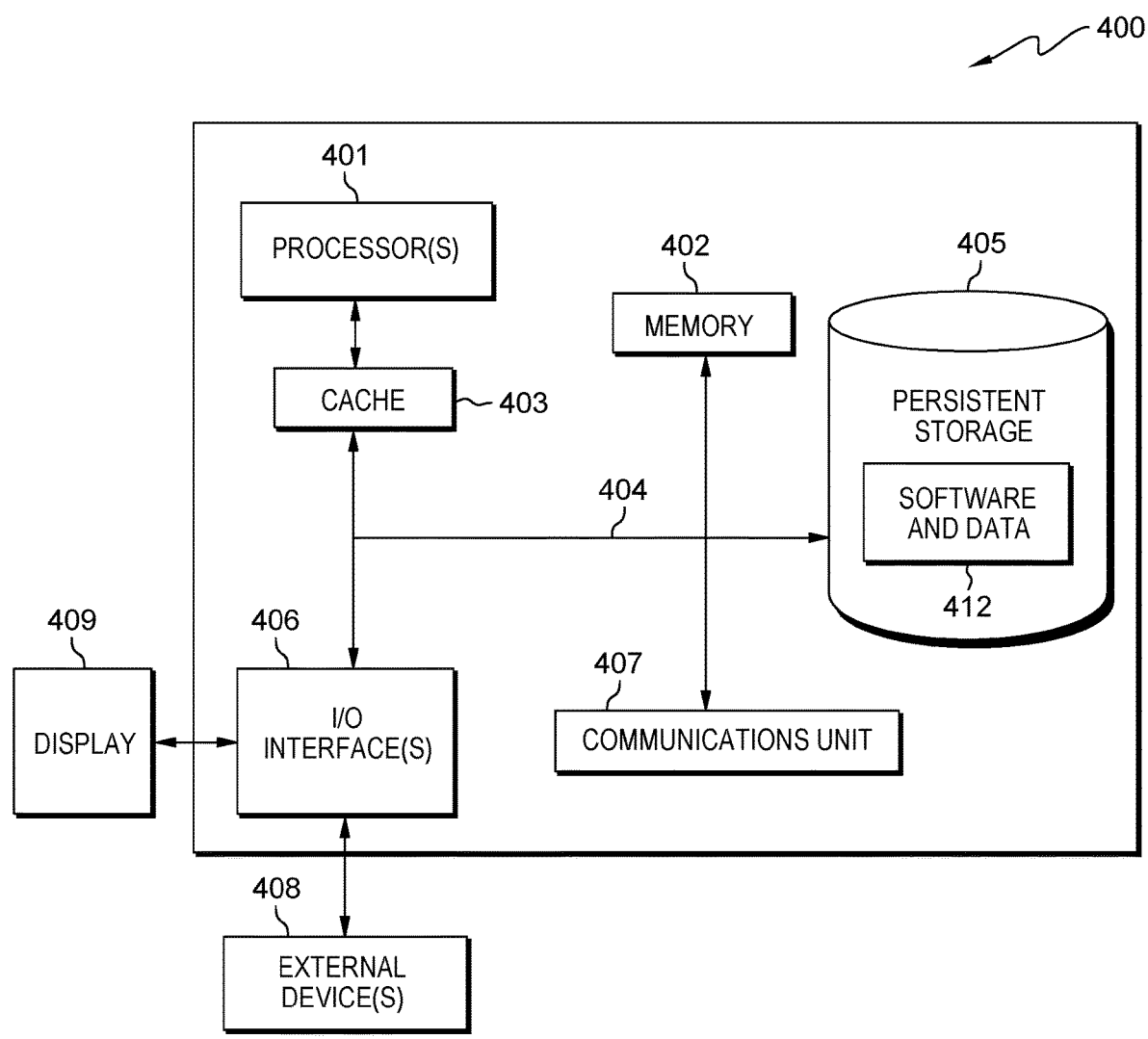
FIG. 4 is a block diagram of components of a computer, in accordance with an embodiment of the present invention.

FIG. 4 depicts computer system 400, which is representative of server 110, server 130, and server 150. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random-access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to server 110, software and data 412 includes security 113, whitelist 114, data information 115, data security information 116, data 120, and data transfer program 200, and other programs and data (not shown). With respect to server 130, software and data 412 includes security 133, whitelist 134, data security information 136, firewall control program 300, and other programs and data (not shown).

Communications unit 407, in these examples, provides for communications with other data processing systems or devices, including resources of server 110, server 130, and server 150. In these examples, communications unit 407 includes one or more network interface cards. Communications unit 407 may provide communications, through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone. Alternatively, display 409 displays information to a user based on a projection technology, such as virtual retinal display, a virtual display, or image projector.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    establishing, by one or more computer processors, a first communication channel between a first server and a second server;
    transmitting, by one or more computer processors, via the first communication channel, information related to a pending transmission of data from the first server to the second server;
    responsive to transmitting the information related to the pending transmission of the data from the first server to the second server, receiving, by one or more computer processors, from the second server via the first communication channel, a set of security information associated with accessing the second server via a second communication channel;
    establishing, by one or more computer processors, the second communication channel between the first server and the second server based on the set of security information received from the second server; and
    transmitting, by one or more computer processors, the data from the first server to the second server utilizing the established second communication channel,
    wherein transmitting the data from the first server to the second server utilizing the second communication channel and the established network connection occurs at or after a timestamp dictated within the received set of security information.

2. The method of claim 1, wherein the first communication channel is a hyperlocal ad hoc network within a computing center.

3. The method of claim 1, wherein the information related to the pending transmission of the data from the first server includes an estimated size of data to communicate to the second server, an Internet protocol (IP) address and corresponding port ID that transmits the data from the first server via the second communication channel, and a timestamp.

4. The method of claim 1, wherein the set of security information received from the second server includes an IP address and corresponding port ID of a firewall port corresponding to the second server, an identifier token, a timestamp corresponding to a time when the firewall port of the second server opens for communications via the second communication channel, and a maximum time duration that the firewall port is kept open.

5. The method of claim 4, wherein the received set of security information further includes a dictate to utilize an encryption algorithm and a corresponding encryption key to encrypt packets of the data transmitted from the first server to the second server.

6. The method of claim 1, further comprising:
determining, by one or more computer processors, based on the received set of security information, to encrypt packets of the data transmitted to the second server via the second communication channel; and
encrypting, by one or more computer processors, in real-time, the plurality of packets of the data to transmit based on an encryption key included within the received set of security information and a dictated encryption algorithm identified within the received set of security information.

7. A computer program product comprising:
one or more computer readable storage media and program instructions stored on the one or more computer readable storage medium, the program instructions readable/executable by one or more computer processors:
program instructions to establish a first communication channel between a first server and a second server;
program instructions to transmit, via the first communication channel, information related to a pending transmission of data from the first server to the second server;
responsive to transmitting the information related to the pending transmission of the data from the first server to the second server, program instructions to receive from the second server via the first communication channel, a set of security information associated with accessing the second server via a second communication channel;
program instructions to establish, the second communication channel between the first server and the second server based on the set of security information received from the second server; and
program instructions to transmit the data from the first server to the second server utilizing the established second communication channel,
wherein transmitting the data from the first server to the second server utilizing the second communication channel and the established network connection occurs at or after a timestamp dictated within the received set of security information.

8. The computer program product of claim 7, wherein the first communication channel is a hyperlocal ad hoc network within a computing center.

9. The computer program product of claim 7, wherein the information related to the pending transmission of the data from the first server includes an estimated size of data to communicate to the second server, an Internet protocol (IP) address and corresponding port ID that transmits the data from the first server via the second communication channel, and a timestamp.

10. The computer program product of claim 7, wherein the set of security information received from the second server includes an IP address and corresponding port ID of a firewall port corresponding to the second server that receives the data from the first server via the second communication channel, an identifier token, a timestamp corresponding to a time when the firewall port of the second server opens for communications via the second communication channel, and a maximum time duration that the firewall port is kept open.

11. The computer program product of claim 10, wherein the received set of security information further includes a dictate to utilize an encryption algorithm and a corresponding encryption key to encrypt packets of the data transmitted from the first server to the second server.

12. The computer program product of claim 7, further comprising:
program instructions to determine based on the received set of security information, to encrypt packets of the data transmitted to the second server via the second communication channel; and
program instructions to encrypt, in real-time, the plurality of packets of the data to transmit based on an encryption key included within the received set of security information and a dictated encryption algorithm identified within the received set of security information.

13. A computer system comprising:
one or more computer processors;
one or more computer readable storage media; and
program instructions stored on the computer readable storage media for execution by at least one of the one or more computer processors, the program instructions comprising:
program instructions to program instructions to establish a first communication channel between a first server and a second server;
program instructions to transmit, via the first communication channel, information related to a pending transmission of data from the first server to the second server;
responsive to transmitting the information related to the pending transmission of the data from the first server to the second server, program instructions to receive from the second server via the first communication channel, a set of security information associated with accessing the second server via a second communication channel;
program instructions to establish, the second communication channel between the first server and the second server based on the set of security information received from the second server; and
program instructions to transmit the data from the first server to the second server utilizing the established second communication channel,
wherein the set of security information received from the second server includes an IP address and corresponding port ID of a firewall port corresponding to the second server that receives the data from the first server via the second communication channel, an identifier token, a timestamp corresponding to a time when the firewall port of the second server opens for communications via the second communication channel, and a maximum time duration that the firewall port is kept open.

14. The computer system of claim 13, wherein the first communication channel is a hyperlocal ad hoc network within a computing center.

15. The computer system of claim 13, wherein the information related to the pending transmission of the data from the first server includes an estimated size of data to communicate to the second server, an Internet protocol (IP) address and corresponding port ID that transmits the data from the first server via the second communication channel, and a timestamp.

16. The computer system of claim 13, wherein transmitting the data from the first server to the second server utilizing the second communication channel and the established network connection occurs at or after a timestamp dictated within the received set of security information, and wherein the received set of security information further includes a dictate to utilize an encryption algorithm and a corresponding encryption key to encrypt packets of the data transmitted from the first server to the second server.

17. The computer system of claim 13, further comprising:
   program instructions to determine based on the received set of security information, to encrypt packets of the data transmitted to the second server via the second communication channel; and
   program instructions to encrypt, in real-time, the plurality of packets of the data to transmit based on an encryption key included within the received set of security information and a dictated encryption algorithm identified within the received set of security information.

* * * * *